US010240683B2

(12) United States Patent
Verrecchia et al.

(10) Patent No.: US 10,240,683 B2
(45) Date of Patent: Mar. 26, 2019

(54) LOW PROFILE MINIATURE SOLENOID PROPORTIONAL VALVE

(71) Applicant: Parker-Hannifin Corporation, Cleveland, OH (US)

(72) Inventors: Joel Verrecchia, Hollis, NH (US); Jim A. Burns, Wilton, NH (US); Edwin Brown, Hudson, NH (US); Louis Demartino, Ashby, MA (US)

(73) Assignee: Parker-Hannifin Corporation, Cleveland, OH (US)

( * ) Notice: Subject to any disclaimer, the term of this patent is extended or adjusted under 35 U.S.C. 154(b) by 20 days.

(21) Appl. No.: 15/525,373

(22) PCT Filed: Apr. 14, 2016

(86) PCT No.: PCT/US2016/027456
§ 371 (c)(1),
(2) Date: May 9, 2017

(87) PCT Pub. No.: WO2016/176048
PCT Pub. Date: Nov. 3, 2016

(65) Prior Publication Data
US 2017/0370494 A1 Dec. 28, 2017

Related U.S. Application Data

(60) Provisional application No. 62/153,764, filed on Apr. 28, 2015.

(51) Int. Cl.
*F16K 31/06* (2006.01)
*F16K 27/02* (2006.01)
(Continued)

(52) U.S. Cl.
CPC ............ *F16K 31/0658* (2013.01); *F16K 1/46* (2013.01); *F16K 27/029* (2013.01); *H01F 7/081* (2013.01); *H01F 7/1607* (2013.01)

(58) Field of Classification Search
CPC ............ F16K 31/0655; F16K 31/0658; F16K 99/0005; F16K 27/029; F16K 1/46; H01F 7/081; H01F 7/1607
See application file for complete search history.

(56) References Cited

U.S. PATENT DOCUMENTS 6,362,717 B1    3/2002  Lewin
7,249,749 B2 *  7/2007  Niwa ................. F16K 31/0655
                                          251/129.16
(Continued)

FOREIGN PATENT DOCUMENTS

EP    1903581 A2     3/2008
JP    S5819379 A     11/1983
WO    WO 92/09093 A1  5/1992

OTHER PUBLICATIONS

International Search Report and Written Opinion for International Application No. PCT/US2016/027456, dated Jul. 20, 2016.
(Continued)

*Primary Examiner* — Ian G Paquette
(74) *Attorney, Agent, or Firm* — Renner, Otto, Boisselle & Sklar, LLP

(57) ABSTRACT

A solenoid proportional valve includes a valve body (12) defining an inlet (14) and an outlet (16) for a fluid flow through the valve body, and an armature (22) that is moveable along a longitudinal axis from a first closed position to a second open position to control the flow of fluid through the valve. The valve further includes a flux can (32) and a solenoid coil (30) positioned within the flux can. When the solenoid coil is energized, a magnetic field causes the armature to move away from the first position against the valve body, thereby opening the valve. The valve further includes a flux washer (28) that acts as a spring pivot for a spring (26) having an outer edge that is secured by the flux washer. When the solenoid coil is energized, the magnetic
(Continued)

field causes the armature to move away from the first position against the spring force of the spring, thereby opening the valve.

19 Claims, 3 Drawing Sheets

(51) Int. Cl.
*F16K 1/46* (2006.01)
*H01F 7/16* (2006.01)
*H01F 7/08* (2006.01)

(56) References Cited

U.S. PATENT DOCUMENTS

| | | | |
|---|---|---|---|
| 7,673,847 B2 * | 3/2010 | Suzuki | F16K 31/0655 251/129.08 |
| 8,511,337 B2 * | 8/2013 | Nishimura | F16K 1/42 137/487.5 |
| 2012/0228533 A1 * | 9/2012 | Ams | F16K 31/0658 251/129.03 |
| 2013/0112904 A1 * | 5/2013 | Tanari | F16K 31/0655 251/129.15 |

OTHER PUBLICATIONS

Second Written Opinion for International Application No. PCT/US2016/027456, dated Apr. 20, 2017.

\* cited by examiner

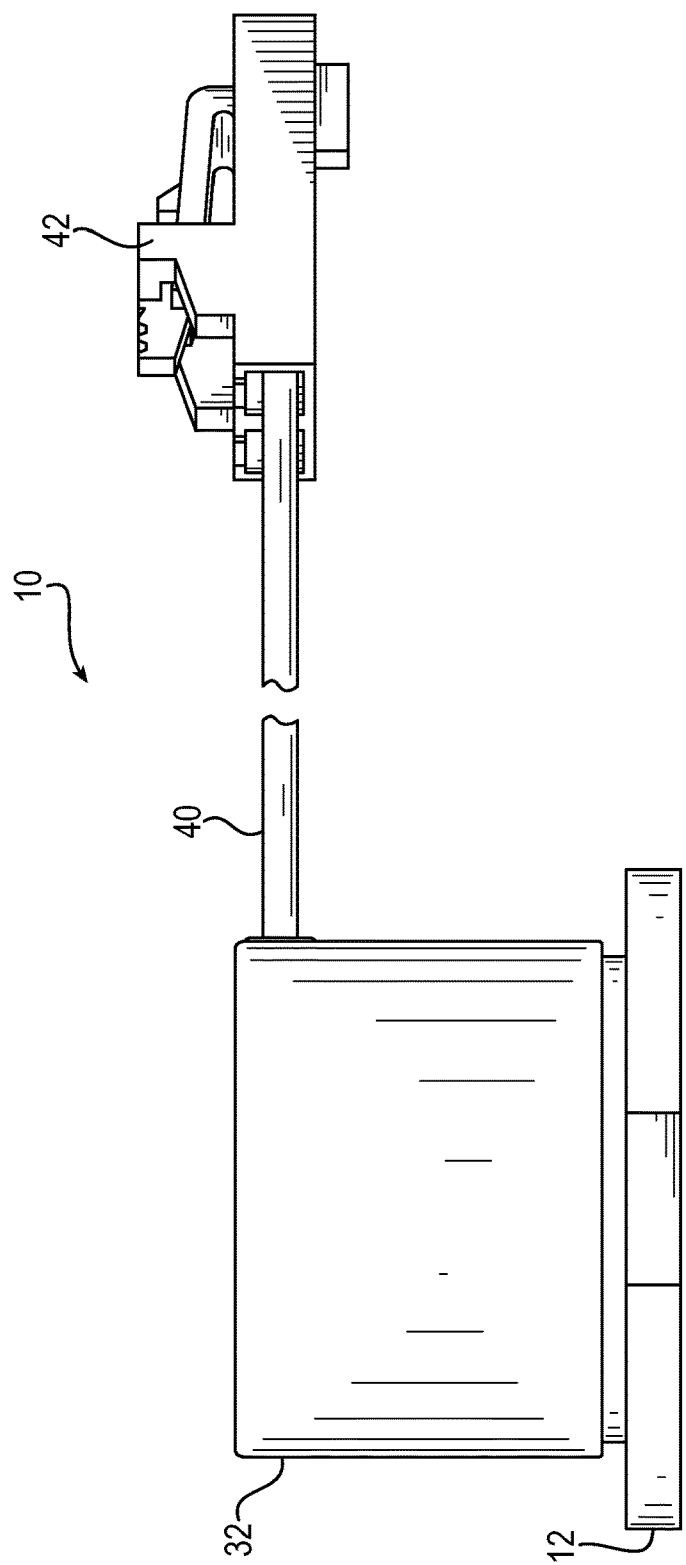

LOW PROFILE MINIATURE SOLENOID PROPORTIONAL VALVE

RELATED APPLICATIONS

This application is a national phase of International Patent Application Serial No. PCT/US2016/027456, filed on Apr. 14, 2016 which claims the benefit of to U.S. Provisional Patent Application No. 62/153,764 filed on Apr. 28, 2015, the entire disclosure of which is hereby incorporated by reference.

FIELD OF INVENTION

The present invention relates generally to solenoid actuator valves, and more particularly to solenoid actuator valves for use in high pressure and high flow applications, such as for example in life science and medical applications.

BACKGROUND OF THE INVENTION

High pressure and high flow valves are used in a variety of applications. For example, clinical laboratories and hospitals utilize various diagnostic apparatuses to analyze patient medical samples, such as blood, urine, other fluids, and tissues. Such applications further include portable medical devices that aid breathing, such as oxygen concentrators and infiltrators. In such apparatuses, high pressure and high flow valves control the flow of gases or other fluids. Because it is desirable for such apparatuses to be as compact as practicable, the size of the valves remains a concern, but with reduced size sufficient speed and efficiency needs to be maintained.

Solenoid valves with an electromagnetically driven actuator may be employed in high pressure and high flow applications. Higher flow and pressure capabilities typically require a larger valve actuator to develop the sealing force needed for valve operation, which poses a significant challenge in balancing size and performance. To achieve higher flow, a larger orifice is required, and consequently a larger stroke to allow full flow to develop. However, this requires more magnetic attraction force from the actuator to overcome the large air gap.

Some improvement in the magnetic attraction force that drives the actuator can be made through magnetic material selection, but the performance difference between materials that are readily available and cost effective is limited. Additional improvements in attraction force can be made through increased coil power and number of wire turns, but there are diminishing returns once the soft magnetic materials have been saturated with the magnetic flux, and peak power budgets must also be considered. Increasing cross-sectional area of the flux path components allows more flux to be carried and thus increases the magnetic attraction force, but this must be balanced against the desire to reduce the valve size and weight for portability. Accordingly, it has proven difficult to reduce valve size while maintaining efficient performance at the requisite high flows and pressures of solenoid actuator valves.

SUMMARY OF THE INVENTION

Aspects of the present invention relate to a proportional valve, such as a pneumatic solenoid proportional valve, that provides an enhanced configuration as compared to conventional configurations. The present invention can achieve a valve structure that is less than one third the size and less than one quarter the weight of conventional configurations for comparable application. To achieve such advantages, exemplary embodiments of the proportional valve include winding a free standing coil, and then fitting the coil into a steel flux can frame. The intimate contact between the coil and the flux can greatly improves magnetic efficiency. In contrast, conventional configurations employ a coil wound around a separate plastic bobbin, and then the bobbin is placed over a non-magnetic stem. The bobbin and stem thickness, as well as the air space between, creates magnetic inefficiencies that are avoided by the configuration of the present invention.

In exemplary embodiments, the proportional valve may employ a flux washer that creates a highly efficient flux path to the moving armature. Again, the free standing coil design allows the flux washer to be in very close proximity to the coil and the moving armature. The flux washer also serves as a pivot ring for a proportional flat spring. This eliminates the need for components pertaining to the spring operation of conventional configurations. Overall, the configuration of the present invention results in combining many parts as compared to conventional configurations, which makes the design easier and more cost effective to manufacture. This proportional valve of the present invention also may incorporate a novel flat spring design which complements the solenoid and provides linear proportional operation.

An aspect of the invention, therefore, is a solenoid proportional valve. In exemplary embodiments, the solenoid proportional valve may include a valve body defining an inlet and an outlet for a fluid flow through the valve body, and an armature having a longitudinal axis, the armature being moveable along the longitudinal axis from a first position to a second position to control the flow of fluid through the valve. The first position may be a closed position in which the armature is against the valve body to prevent fluid flow between the inlet and the outlet, and the second position may be an open position in which the armature is moved away from the valve body to permit fluid flow between the inlet and the outlet. The valve further includes a flux can and a solenoid coil positioned within the flux can. When the solenoid coil is energized, a magnetic field is created which causes the armature to move away from the first position against the valve body, thereby opening the valve. The proportional valve further may include a flux washer, and a spring having an outer edge that is secured by the flux washer, the flux washer acting as a spring pivot that permits flexing of the spring. When the solenoid coil is energized, the magnetic field causes the armature to move away from the first position against the spring force of the spring, thereby opening the valve.

The described configuration reduces the number and size of air gaps through the proportional valve structure as compared to conventional configurations. In the configuration of the present invention, there is only a minimal air gap between the coil and the armature, insofar as the armature extends through the coil. In addition, the flux can and the armature define a minimal air gap, and magnetic flux lines pass from the armature across such air gap directly into the flux can. Similarly, the flux washer and the flux can define another minimal air gap, and magnetic flux lines pass from the flux can across such air gap directly into the flux washer. With the overall reduction in the number and spacing of air gaps, the magnetic flux flow is substantially enhanced over conventional configurations, which permits reducing the valve size and weight while achieving effective performance.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 4 is a drawing depicting an isometric view of the exemplary low profile miniature solenoid proportional valve of FIGS. 1-3.

DETAILED DESCRIPTION

Figure 1:
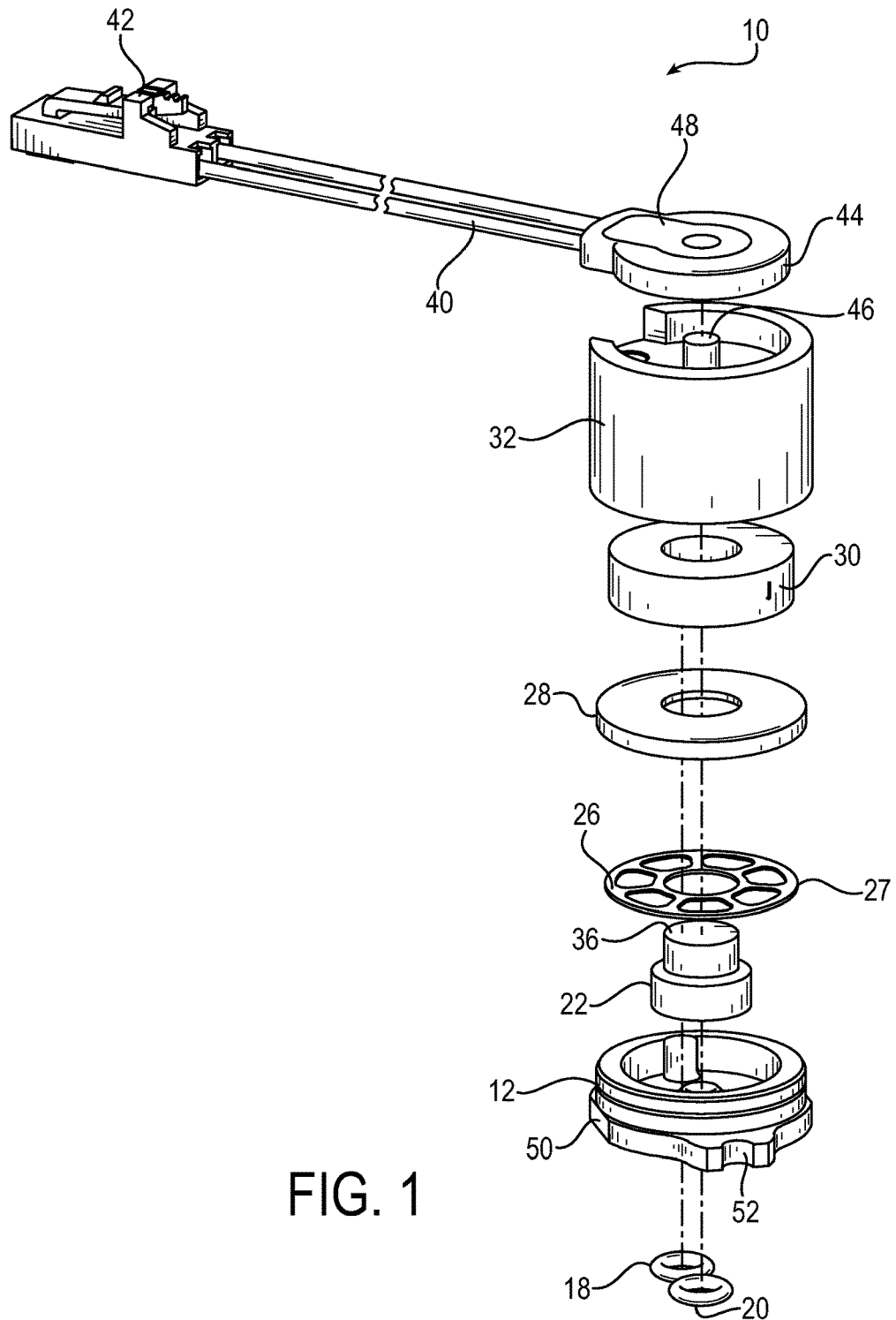
FIG. 1 is a drawing depicting an exploded view of an exemplary low profile miniature solenoid proportional valve in accordance with embodiments of the present invention.

Embodiments of the present invention will now be described with reference to the drawings, wherein like reference numerals are used to refer to like elements throughout. It will be understood that the figures are not necessarily to scale.

Generally, an aspect of the invention is a low profile miniature solenoid proportional valve. In exemplary embodiments, the solenoid proportional valve may include a valve body defining an inlet and an outlet for a fluid flow through the valve body, and an armature having a longitudinal axis, the armature being moveable along the longitudinal axis from a first position to a second position to control the flow of fluid through the valve. The fluid may be any suitable gas or liquid, and as referenced above, the disclosed valve may be used, for example, in medical diagnostic apparatuses, and portable medical devices that aid breathing, such as oxygen concentrators and infiltrators. The first position may be a closed position in which the armature is against the valve body to prevent fluid flow between the inlet and the outlet, and the second position may be an open position in which the armature is moved away from the valve body to permit fluid flow between the inlet and the outlet. The valve further includes a flux can and a solenoid coil positioned within the flux can. When the solenoid coil is energized, a magnetic field is created which causes the armature to move away from the first position against the valve body, toward the second position, thereby opening the valve.

The figures depict an exemplary low profile miniature solenoid proportional valve 10. The solenoid proportional valve 10 of the present invention generally has a more compact size and uses less materials (less weight) as compared to conventional configurations. The present invention can achieve a valve structure that is less than one third the size and less than one quarter the weight of conventional configurations, for a comparable application. In addition, the configuration of the present invention reduces the number and spatial extent of air gaps, resulting in an enhanced transmission of magnetic flux while maintaining such more compact size and weight as compared to conventional configurations.

In the exemplary embodiment of FIGS. 1-4, the solenoid proportional valve 10 includes a valve body 12 that defines an inlet port 14 and an outlet port 16. When the valve is open, fluid, such as a gas for example, can flow from the inlet port and through the outlet port. The ports are sealed by first and second O-rings 18 and 20.

Further in the exemplary embodiment of FIGS. 1-4, an armature 22 has a longitudinal axis and is moveable along the longitudinal axis between a first position and a second position. The first position may be a closed position, and in the second position the valve may be maximally open to provide a maximum flow of gas or other fluid through the inlet and outlet ports. In the first position, which is depicted for example in FIG. 2, as referenced above the valve is closed, which prevents fluid flow between the inlet port 14 and outlet port 16. The armature may include an elastomeric element 24 (see particularly FIG. 2) that provides an additional seal against the outlet port when the valve is closed, i.e., when the armature 22 is in the first or closed position.

The proportional valve 10 further may include a flux washer, and a spring having an outer edge that is secured by the flux washer, the flux washer acting as a spring pivot that permits flexing of the spring. When the solenoid coil is energized, the magnetic field causes the armature to move away from the first position against the spring force of the spring toward the second position, thereby opening the valve. Referring to the figures as an exemplary embodiment, the armature may be biased in the closed position when the valve is de-energized by a proportional spring configured as a flat spring 26, which may be preloaded into a flux washer 28 to provide the closed position bias. The flat spring 26 is secured in position at an outer edge 27 by the flux washer 28. The flux washer may be made of a magnetic material, and thus the flux washer acts both as a part of the magnetic flux path as a flux coupler between the flux can and the armature, and as a spring pivot that permits the flat spring 26 to flex to permit opening of the valve. The flat spring also may be made of a magnetic material to aid in the transmission of magnetic flux lines when the valve is energized.

Figure 2:
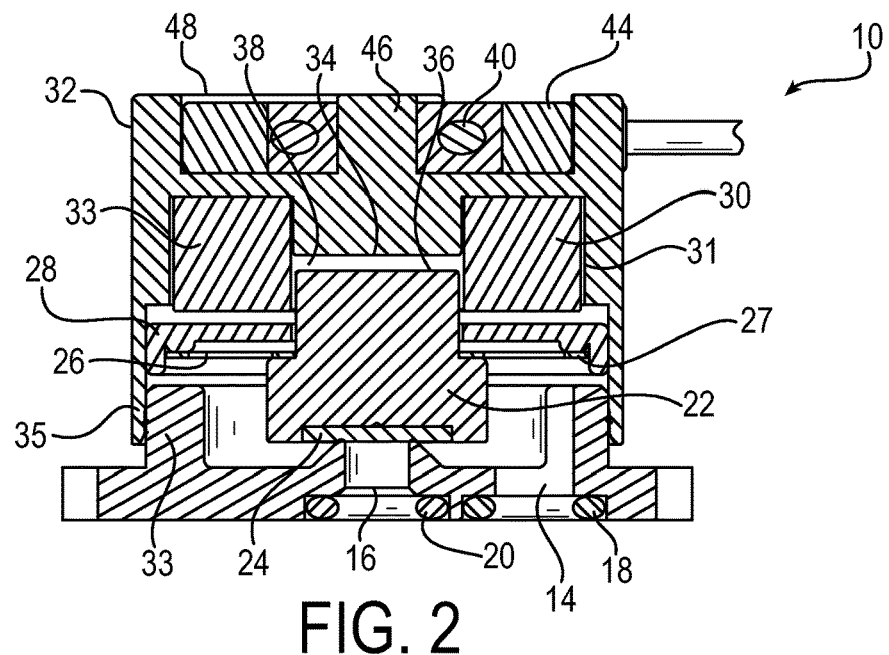
FIG. 2 is a drawing depicting a side cross sectional view of the exemplary low profile miniature solenoid proportional valve of FIG. 1.
Figure 3:
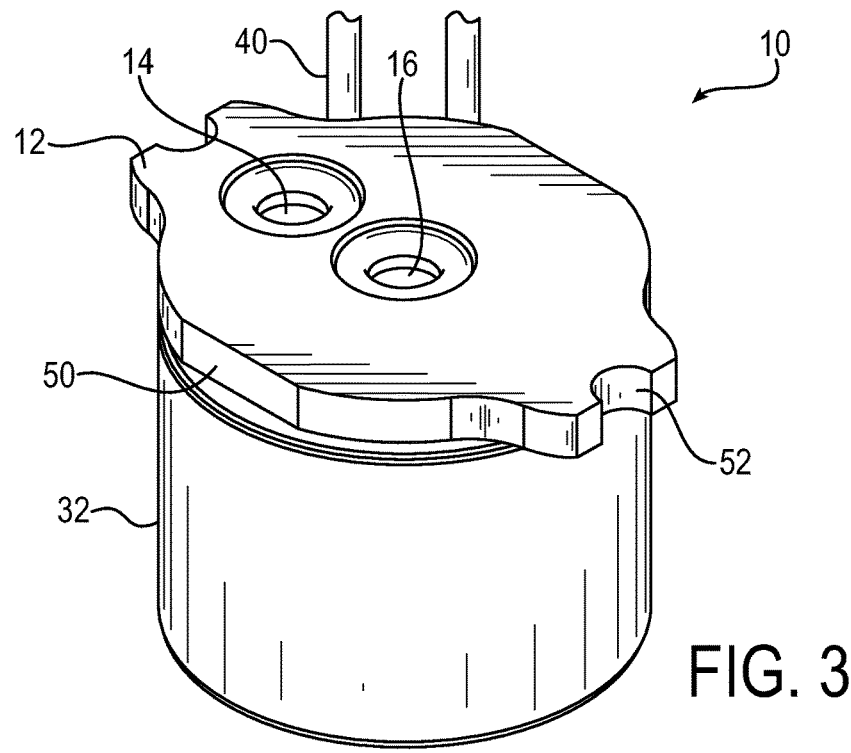
FIG. 3 is a drawing depicting an isometric view of operative portions of the exemplary low profile miniature solenoid proportional valve of FIGS. 1 and 2.

Further in the exemplary embodiment of FIGS. 1-4, a solenoid coil 30 includes a coil of wire 31 wrapped around a supporting mandrel 33. The solenoid coil 30 is housed within a flux can 32 in a manner by which the solenoid coil is fully encompassed within the flux can. As seen in FIG. 2, in particular, the flux can may have an end extension 35 that extends around at least a portion of the valve body 12, such as around a ridge 13. The end extension 35 of the flux can also may extend around the flux washer 28, which permits as referenced above the flux washer 28 to act as part of the magnetic flux path as a flux coupler between the flux can and the armature.

The solenoid coil 30 may be configured as a cylindrical ring defining a central opening, and the armature 22 has an upper end 36 that is moveable through the central opening. As seen particularly in the cross-sectional view of the example of FIG. 2, the flux can 32 may have a central portion constituting a fixed pole 34 that is positioned opposite the upper end 36 of the armature 22. The fixed pole 34 thus extends partially through the central opening of the solenoid coil 30. Accordingly, as seen in the closed position of the cross-sectional view of FIG. 2 in particular, the fixed pole 34 and the upper end 36 of the armature 22 define a stroke distance 38 within the central opening of the solenoid coil in which the armature is moveable between the first (closed) position and the second (fully open) position.

Further in the exemplary embodiment of FIGS. 1-4, current supplying supply wires 40 may extend from the solenoid coil 30 through the flux can 32 to provide an electrical connection to an electrical connector 42 for energizing the solenoid coil. The electrical connector typically would be electrically connected to a power source (not shown) for energizing the solenoid coil. A wire insulator 44 may constitute a housing that houses a portion or portions of the supply wires 40 within the flux can 32, or as the wires extend through the flux can 32. The wire insulator 44 in particular may be located around a pin 46 that is part of the flux can 32 so as to properly position the wires 40. An insert 48 further may be provided that holds the wire insulator within the flux can so as to aid in securing the wire insulator with the wires in place securely within the flux can 32. In exemplary embodiments, the insert may be made of any suitable rigid plastic, so as to provide an effective hold without being electrically conductive.

The valve body 12 further may include additional features that aid in assembly and securing the valve to operating equipment, such as suitable medical devices and diagnostic apparatuses that may employ the proportional valve 10. For example, as depicted particularly in FIGS. 1 and 3, the valve body 12 may include flat faces 50 along a valve body edge, which may aid in fastening and de-fastening the valve body 12 relative to the flux can 32 with any suitable tool similarly shaped. The valve body 12 further may include fastening recesses 52 for receiving fastening elements (e.g., bolts, screws, or the like), for fastening the proportional valve 10 to the operating equipment.

In an example of operation of the proportional valve 10, when the solenoid coil 30 is energized, a magnetic field is created. The magnetic flux lines loop out of the solenoid coil 30 and through the flux can 32, along the side and into the flux washer 28. The flux lines then jump an air gap from the flux washer directly into the armature 22 and back into the flux can through the stroke distance gap 38. The magnetic field causes the armature to move off the valve body against the spring force of the flat spring 26, thereby opening the valve. At maximum energy, the armature has moved to the second, fully open position. When the armature has moved away from the valve body, thereby opening the valve, gas or other fluid can flow between the inlet port 14 and the outlet port 16. The armature also may settle at positions intermediate of the first (closed) position and the second (fully open) position depending upon the degree of energizing of the solenoid coil below the maximum. In this manner, a fine control of fluid flow through the valve is achieved.

By eliminating a separate bobbin including the coil, the configuration of the present invention reduces the number and size of air gaps through the proportional valve structure. In particular, additional air gaps between the bobbin and the armature are essentially eliminated in the present invention. In the configuration of the present invention, there is only a minimal air gap between the coil 30 and the armature 22, insofar as the armature extends through the coil. In addition, the flux can and the armature define a minimal air gap, and magnetic flux lines pass from the armature across such air gap directly into the flux can. This air gap defines the stroke distance 38 of the armature. Similarly, the flux washer and the flux can define another minimal air gap, and magnetic flux lines pass from the flux can across such air gap directly into the flux washer. The absence of a separate bobbin eliminates the additional air gaps common in conventional configurations. With the overall reduction in the number and spacing of air gaps, the magnetic flux flow is substantially enhanced over conventional configurations, which permits reducing the valve size and weight while achieving effective performance. In addition, the use of a flat spring held by the flux washer as a spring pivot provides for a smoother operation of opening motion and return as the coil respectively is energized and de-energized.

An aspect of the invention, therefore, is a solenoid proportional valve. In exemplary embodiments, the solenoid proportional valve includes a valve body defining an inlet and an outlet for a fluid flow through the valve body, and an armature having a longitudinal axis, the armature being moveable along the longitudinal axis from a first position to a second position. The first position may be a closed position in which the armature is against the valve body to prevent fluid flow between the inlet and the outlet, and the second position may be an open position in which the armature is moved away from the valve body to permit fluid flow between the inlet and the outlet. The solenoid proportional valve further may include a flux can, and a solenoid coil positioned within the flux can. When the solenoid coil is energized, a magnetic field is created which causes the armature to move away from the first position against the valve body, thereby opening the valve. The solenoid proportional valve may include one or more of the following features, either individually or in combination.

In an exemplary embodiment of the solenoid proportional valve, the flux can and the armature define an air gap, and magnetic flux lines pass from the armature across the air gap directly into the flux can.

In an exemplary embodiment of the solenoid proportional valve, the air gap defines a stroke distance of the armature.

In an exemplary embodiment of the solenoid proportional valve, the solenoid proportional valve further includes a flux washer, and a spring having an outer edge that is secured by the flux washer, the flux washer acting as a spring pivot that permits flexing of the spring. When the solenoid coil is energized the magnetic field causes the armature to move away from the first position against the spring force of the spring, thereby opening the valve.

In an exemplary embodiment of the solenoid proportional valve, the flux washer and the flux can define another air gap, and magnetic flux lines pass from the flux can across the another air gap directly into the flux washer.

In an exemplary embodiment of the solenoid proportional valve, the spring is preloaded to bias the armature in the first position.

In an exemplary embodiment of the solenoid proportional valve, the spring is a flat spring.

In an exemplary embodiment of the solenoid proportional valve, the spring is made of a magnetic material.

In an exemplary embodiment of the solenoid proportional valve, the solenoid coil is a cylindrical ring defining a central opening, and the armature has an upper end that is moveable through the central opening.

In an exemplary embodiment of the solenoid proportional valve, the flux can has a central portion constituting a fixed pole that is positioned opposite the upper end of the armature, and the fixed pole extends partially through the central opening of the solenoid coil to define a stroke distance within the central opening of the solenoid coil in which the armature is moveable between the first position and the second position.

In an exemplary embodiment of the solenoid proportional valve, the flux can has an end extension that extends around at least a portion of the valve body.

In an exemplary embodiment of the solenoid proportional valve, the flux can has an end extension that extends around the flux washer.

In an exemplary embodiment of the solenoid proportional valve, the solenoid proportional valve further includes O-rings that respectively seal the inlet and the outlet.

In an exemplary embodiment of the solenoid proportional valve, the armature has an elastomeric element that provides a seal against the outlet when the armature is in the first position.

In an exemplary embodiment of the solenoid proportional valve, the solenoid proportional valve further includes a supply wire that extends from the solenoid coil through the flux can to provide an electrical connection for energizing the solenoid coil.

In an exemplary embodiment of the solenoid proportional valve, the solenoid proportional valve further includes a wire insulator that houses a portion of the supply wire within the flux can.

In an exemplary embodiment of the solenoid proportional valve, the wire insulator is located around a pin that is part of the flux can.

In an exemplary embodiment of the solenoid proportional valve, the solenoid proportional valve further includes an insert that holds the wire insulator within the flux can.

In an exemplary embodiment of the solenoid proportional valve, the insert is a plastic insert.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A solenoid proportional valve comprising:
a valve body defining an inlet and an outlet for a fluid flow through the valve body;
an armature having a longitudinal axis, the armature being moveable along the longitudinal axis from a first position to a second position, wherein the first position is a closed position in which the armature is against the valve body to prevent fluid flow between the inlet and the outlet, and the second position is an open position in which the armature is moved away from the valve body to permit fluid flow between the inlet and the outlet;
a flux can;
a solenoid coil positioned within the flux can, wherein the solenoid coil is a free standing coil that is fitted into a frame of the flux can;
wherein when the solenoid coil is energized, a magnetic field is created which causes the armature to move away from the first position against the valve body, thereby opening the valve; and
a flux washer positioned as a flux coupler between the flux can and the armature, such that magnetic flux lines move along the flux can into the flux washer and jump an air gap from the flux washer directly into the armature.

2. The solenoid proportional valve of claim 1, wherein the flux can has an end extension that extends around at least a portion of the valve body.

3. The solenoid proportional valve of claim 1, wherein the flux can and the armature define the air gap, and magnetic flux lines pass from the armature across the air gap directly into the flux can.

4. The solenoid proportional valve of claim 3, wherein the air gap defines a stroke distance of the armature.

5. The solenoid proportional valve of claim 1, wherein the solenoid coil is a cylindrical ring defining a central opening, and the armature has an upper end that is moveable through the central opening.

6. The solenoid proportional valve of claim 5, wherein the flux can has a central portion constituting a fixed pole that is positioned opposite the upper end of the armature, and the fixed pole extends partially through the central opening of the solenoid coil to define a stroke distance within the central opening of the solenoid coil in which the armature is moveable between the first position and the second position.

7. The solenoid proportional valve of claim 1, further comprising O-rings that respectively seal the inlet and the outlet.

8. The solenoid proportional valve of claim 7, wherein the armature has an elastomeric element that provides a seal against the outlet when the armature is in the first position.

9. The solenoid proportional valve of claim 1, further comprising a supply wire that extends from the solenoid coil through the flux can to provide an electrical connection for energizing the solenoid coil.

10. The solenoid proportional valve of claim 9, further comprising a wire insulator that houses a portion of the supply wire within the flux can.

11. The solenoid proportional valve of claim 10, wherein the wire insulator is located around a pin that is part of the flux can.

12. The solenoid proportional valve of claim 10, further comprising an insert that holds the wire insulator within the flux can.

13. The solenoid proportional valve of claim 12, wherein the insert is a plastic insert.

14. A solenoid proportional valve comprising:
a valve body defining an inlet and an outlet for a fluid flow through the valve body;
an armature having a longitudinal axis, the armature being moveable along the longitudinal axis from a first position to a second position, wherein the first position is a closed position in which the armature is against the valve body to prevent fluid flow between the inlet and the outlet, and the second position is an open position in which the armature is moved away from the valve body to permit fluid flow between the inlet and the outlet;

a flux can;

a solenoid coil positioned within the flux can, wherein the solenoid coil is a free standing coil that is fitted into a frame of the flux can;

wherein when the solenoid coil is energized, a magnetic field is created which causes the armature to move away from the first position against the valve body, thereby opening the valve;

a flux washer; and a spring having an outer edge that is secured by the flux washer, the flux washer acting as a spring pivot that permits flexing of the spring;

wherein when the solenoid coil is energized the magnetic field causes the armature to move away from the first position against the spring force of the spring, thereby opening the valve.

15. The solenoid proportional valve of claim 14, wherein the flux washer and the flux can define another air gap, and magnetic flux lines pass from the flux can across the another air gap directly into the flux washer.

16. The solenoid proportional valve claim 14, wherein the spring is preloaded to bias the armature in the first position.

17. The solenoid proportional valve of any of claim 14, wherein the spring is a flat spring.

18. The solenoid proportional valve of any of claim 14, wherein the spring is made of a magnetic material.

19. The solenoid proportional valve of claim 14, wherein the flux can has an end extension that extends around the flux washer.

* * * * *